Patented May 16, 1950

2,508,035

UNITED STATES PATENT OFFICE 2,508,035

COMPOUNDS HAVING SURFACE ACTIVITY AND PROCESS FOR PREPARING THEM

Milton Kosmin, Los Angeles, Calif., assignor to Monsanto Chemical Company, St. Louis, Mo., a corporation of Delaware No Drawing. Application November 19, 1947,
Serial No. 787,031

5 Claims. (Cl. 260—615)

The present invention relates to compounds having high surface activity, which compounds are materials of the polyglycol ether type.

It is known, according to the disclosure of U. S. Patent 1,970,578, that straight chain organic alcohols may be reacted with ethylene oxide to produce polyglycol ethers. It is, furthermore, pointed out in the above patent that these materials may be used as surface active materials, including wetting out activity useful for treating textile products. After preparing and testing straight chain polyglycol ethers according to the prior known methods, I have found that these materials do not possess a sufficiently high activity as wetting agents to make their use for this purpose of commercial value.

I have now found, however, that if in place of the straight chain alcohols previously employed, I employ 5-ethyl-nonanol-2 and condense the same with ethylene oxide so that at least 5 moles, but less than 16 moles, of ethylene oxide are combined as the polyglycol ether radical I obtain a series of products exhibiting greatly improved wetting properties in aqueous solution. The improvement manifests itself throughout the range of compositions produced from 5 moles of ethylene oxide per mole of alcohol to and including 15 moles of ethylene oxide per mole of alcohol, the improvement commencing sharply when the composition contains 5 moles of condensed ethylene oxide per mole of alcohol and ending sharply when 15 moles of ethylene oxide are condensed per mole of alcohol.

The present compounds are believed to have the structural formula indicated below:

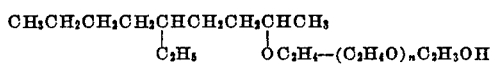

where $n$ is an integer having a value of from 3 to 13.

The improvement in surface activity possessed by the present compounds may be illustrated by comparing the speed of wetting as measured by the well known Draves test upon aqueous solutions of the present and related materials. In the tabulation below is shown the speed of wetting in seconds as measured by the Draves test upon 0.5% water solutions of each of the products described herein. Obviously, other suitable concentrations may be employed.

| Product tested | Speed of Wetting |
|---|---|
| | Seconds |
| n-Decanol+5 moles Ethylene Oxide | Instant |
| n-Decanol+10 moles Ethylene Oxide | 8.2 |
| n-Decanol+15 moles Ethylene Oxide | 35.6 |
| Technical Lauryl Alcohol+5 moles Ethylene Oxide | 8.8 |
| Technical Lauryl Alcohol+10 moles Ethylene Oxide | 10.9 |
| Technical Lauryl Alcohol+15 moles Ethylene Oxide | 30.8 |
| 5-Ethyl Nonanol-2+5 moles Ethylene Oxide | Instant |
| 5-Ethyl Nonanol-2+10 moles Ethylene Oxide | Instant |
| 5-Ethyl Nonanol-2+15 moles Ethylene Oxide | 1.9 |

For the purpose of comparison, data are presented in the above tabulation showing the speed of wetting of closely related products.

The condensation products were produced according to the following examples:

Example 1

One gram mole of 5-ethyl nonanol-2 is placed in a container and heated to 155° to 160° C. 0.2% solid KOH is added to the alcohol and then a stream of gaseous ethylene oxide is passed into the heated alcohol. The addition of ethylene oxide is condensed in this manner until a total of 5 moles, as determined by increase in weight, has combined with the alcohol. The reaction is then stopped by discontinuing the flow of ethylene oxide and the product removed from the reaction vessel. The product is a yellow, low-melting solid, freely soluble in water and exhibits exceedingly rapid wetting properties. When dissolved in water in amounts sufficient to form 0.5% solution the solution so prepared possessed an instant wetting speed in the Draves test.

The product produced according to this example has the structural formula:

CH₃CH₂CH₂CH₂CHCH₂CH₂CHCH₃
         |                |
         C₂H₅          OC₂H₄—(C₂H₄O)₃C₂H₄OH

Example 2

One gram mole of 5-ethyl nonanol-2 was heated at a temperature of 150° to 160° C. with ethylene oxide, as described in Example 1 above. The addition of ethylene oxide was continued until a total of 10 gram moles of ethylene oxide as determined by increase in weight had combined with the alcohol. The reaction was discontinued and the product removed from the reaction vessel. The product was a yellow, low-melting solid, freely soluble in water and when dissolved in water to form a 0.5% solution, the solution was found to possess an instant wetting speed in the Draves test.

The product produced according to this example has the structural formula:

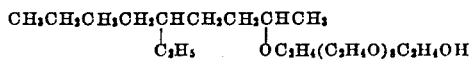

Example 3

One gram mole of 5-ethyl nonanol-2 was condensed with ethylene oxide in the same manner as disclosed in Example 1 above, with the exception that the addition of ethylene oxide to the alcohol was continued until a total of 15 moles of ethylene oxide had combined with the alcohol. The product was a yellow, low-melting solid, freely soluble in water and exhibiting a wetting speed in the Draves test of 1 to 9 seconds.

The product produced according to this example has the structural formula:

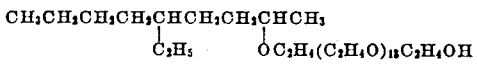

The above products may also be employed as efficient detergents for the washing of soiled textile products. When so employed they may be utilized directly as produced in the above examples, or they may be combined with builders such as the various alkali metal salts, particularly the alkaline phosphates and employed in the built form.

What I claim is:

1. Compounds having the formula:

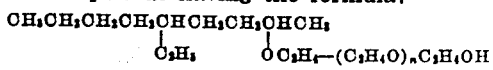

where $n$ is an integer having a value of from 3 to 13.

2. A compound having the formula:

$$CH_3CH_2CH_2CH_2CHCH_2CH_2CHCH_3$$
$$\quad\quad\quad\; |\quad\quad\quad\quad |$$
$$\quad\quad C_2H_5\quad\quad OC_2H_4-(C_2H_4O)_2C_2H_4OH$$

3. A compound having the formula:

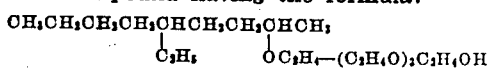

4. A compound having the formula:

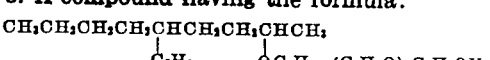

5. The process which comprises passing ethylene oxide into 5-ethyl nonanol-2 until at least 5 moles and less than 16 moles of ethylene oxide have combined with each mole of said 5-ethyl nonanol-2.

MILTON KOSMIN.

REFERENCES CITED

The following references are of record in the file of this patent:

UNITED STATES PATENTS

| Number | Name | Date |
|---|---|---|
| 2,316,842 | Coleman | Apr. 20, 1943 |
| 2,355,823 | Schlegel | Aug. 15, 1944 |

FOREIGN PATENTS

| Number | Country | Date |
|---|---|---|
| 584,367 | Great Britain | Jan. 14, 1947 |